(12) United States Patent
Chai et al.

(10) Patent No.: US 11,582,243 B2
(45) Date of Patent: Feb. 14, 2023

(54) SYSTEMS AND METHODS FOR PROTECTING AGAINST EXPOSURE TO CONTENT VIOLATING A CONTENT POLICY

(71) Applicant: GOOGLE LLC, Mountain View, CA (US)

(72) Inventors: Hongjie Chai, Mountain View, CA (US); Vincent Zanotti, Mountain View, CA (US); Bruce Feldman, Campbell, CA (US); Houman Alborzi, Mountain View, CA (US); Robert Malkin, Pittsburgh, PA (US); Girija Narlikar, Palo Alto, CA (US); Brianna Burr, San Tan Valley, AZ (US); Mark Russell, Allison Park, PA (US)

(73) Assignee: GOOGLE LLC, Mountain View, CA (US)

( * ) Notice: Subject to any disclaimer, the term of this patent is extended or adjusted under 35 U.S.C. 154(b) by 93 days.

(21) Appl. No.: 17/066,239

(22) Filed: Oct. 8, 2020

(65) Prior Publication Data
US 2022/0116402 A1     Apr. 14, 2022

(51) Int. Cl.
*H04L 9/40*     (2022.01)
*G06F 16/45*    (2019.01)
*G06N 20/00*    (2019.01)

(52) U.S. Cl.
CPC ............ *H04L 63/104* (2013.01); *G06F 16/45* (2019.01); *G06N 20/00* (2019.01)

(58) Field of Classification Search
CPC ....... H04L 63/104; G06F 16/45; G06N 20/00; H04N 21/00; H04N 21/454; H04N 21/4542; H04N 21/4545
See application file for complete search history.

(56) References Cited

U.S. PATENT DOCUMENTS

| 8,788,442 B1 * | 7/2014 | Sculley, II ............. G06N 20/00 706/20 |
| 8,959,574 B2 * | 2/2015 | Kuhlman ................ G06F 21/10 726/1 |

(Continued)

OTHER PUBLICATIONS

García-Recuero, Álvaro. "Discouraging abusive behavior in privacy-preserving online social networking applications." Proceedings of the 25th International Conference Companion on World Wide Web. 2016. (Year: 2016).*

(Continued)

*Primary Examiner* — Jung W Kim
*Assistant Examiner* — Sameera Wickramasuriya
(74) *Attorney, Agent, or Firm* — Dority & Manning, P.A.

(57) ABSTRACT

A method for protecting against exposure to content violating a content policy, the method including receiving a number of content items including a first set of content items associated with a content group, determining a measurement associated with an amount of the first set of content items belonging to a specific content category, assigning one or more of the number of content items to be categorized by at least one of the machine learning algorithm or a manual review process, automatically applying the specific content category to one or more other content items of the content group such that the one or more other content items are not reviewed by the manual review process, and transmitting at least one of the number of content items, wherein the content category of each of the number of content items indicates whether the specific content item violates any content policies.

20 Claims, 5 Drawing Sheets

(56) References Cited

U.S. PATENT DOCUMENTS

| | | | | |
|---|---|---|---|---|
| 10,349,134 | B2* | 7/2019 | Hamiti | H04N 21/454 |
| 10,394,408 | B1* | 8/2019 | Freund | H04N 21/00 |
| 10,599,774 | B1* | 3/2020 | Luo | G06N 3/084 |
| 10,643,112 | B1* | 5/2020 | Mu | G06V 40/168 |
| 10,827,023 | B1* | 11/2020 | Yan | H04L 67/22 |
| 10,944,805 | B1* | 3/2021 | Zhong | H04L 65/605 |
| 11,032,316 | B1* | 6/2021 | Sidhu | G06K 9/6256 |
| 11,048,979 | B1* | 6/2021 | Zhdanov | G06K 9/6257 |
| 11,153,243 | B1* | 10/2021 | Deatrick | H04L 51/04 |
| 11,172,257 | B2* | 11/2021 | Blanchard | H04N 21/454 |
| 2008/0219495 | A1* | 9/2008 | Hulten | G06K 9/6267 |
| | | | | 382/100 |
| 2011/0047388 | A1* | 2/2011 | Park | G06F 21/6209 |
| | | | | 380/283 |
| 2015/0023552 | A1* | 1/2015 | Rosen | G06T 7/0002 |
| | | | | 382/103 |
| 2015/0125074 | A1* | 5/2015 | Yu | G06T 7/90 |
| | | | | 382/164 |
| 2016/0012213 | A1* | 1/2016 | Walsh | G06F 21/629 |
| | | | | 726/27 |
| 2016/0162576 | A1* | 6/2016 | Ariño de la Rubia | |
| | | | | G06F 21/6218 |
| | | | | 707/739 |
| 2016/0350675 | A1* | 12/2016 | Laks | G06N 20/00 |
| 2017/0134406 | A1* | 5/2017 | Guo | H04L 63/123 |
| 2017/0272818 | A1* | 9/2017 | Gattis | H04N 21/44008 |
| 2017/0289624 | A1* | 10/2017 | Avila | H04N 21/4545 |
| 2017/0295249 | A1* | 10/2017 | Vickrey | G06F 16/24578 |
| 2018/0176641 | A1* | 6/2018 | Yun | G06N 3/0445 |
| 2018/0253661 | A1* | 9/2018 | Strauss | G06Q 50/01 |
| 2018/0373980 | A1* | 12/2018 | Huval | G06K 9/6254 |
| 2019/0034827 | A1* | 1/2019 | Grechka | G06Q 50/01 |
| 2019/0073593 | A1 | 3/2019 | Luo et al. | |
| 2020/0177942 | A1* | 6/2020 | Wu | G06F 16/3347 |
| 2020/0196011 | A1* | 6/2020 | Wyatte | G06N 3/0454 |
| 2020/0226431 | A1* | 7/2020 | Zeiler | G06V 20/10 |
| 2021/0035183 | A1* | 2/2021 | Saternos | G06Q 30/0631 |

OTHER PUBLICATIONS

T. T. T. Nguyen and G. Armitage, "A survey of techniques for internet traffic classification using machine learning," in IEEE Communications Surveys & Tutorials, vol. 10, No. 4, pp. 56-76, Fourth Quarter 2008, doi: 10.1109/SURV.2008.080406. (Year: 2008 ).*

International Search Report for Application No. PCT/US2021/053387, dated Feb. 7, 2022, 5 pages.

* cited by examiner

SYSTEMS AND METHODS FOR PROTECTING AGAINST EXPOSURE TO CONTENT VIOLATING A CONTENT POLICY

BACKGROUND

It may be desirable for a content provider to filter content served to users. For example, a content provider may wish to prevent content with adult themes (e.g., alcohol, firearms, tobacco, etc.) from being served to impressionable audiences (e.g., children, etc.). Filtering content may require developing an understanding of what the content includes, depicts, and/or represents. However, content providers may receive such a large volume of content items that it is infeasible to provide human review of each content item. Moreover, automated systems such as machine learning algorithms may incorrectly classify some portion of content items, thereby risking that inappropriate content (e.g., content violating a content policy, etc.) is served to users. Therefore, an improved system for protecting against serving improper content is needed.

SUMMARY

One implementation of the disclosure relates to a method for protecting against exposure to content violating a content policy, the method including receiving, by one or more processors, a number of content items including a first set of content items associated with a content group, wherein at least some of the number of content items include a content category determined by a machine learning algorithm based on the content policy, determining, by the one or more processors, a measurement associated with an amount of the first set of content items belonging to a specific content category, responsive to determining a first result from performing an operation using the measurement and a threshold, assigning, by the one or more processors, one or more of the number of content items to be categorized by at least one of the machine learning algorithm or a manual review process, responsive to determining a second result from performing the operation using the measurement and the threshold, automatically applying, by the one or more processors, the specific content category to one or more other content items of the content group such that the one or more other content items are not reviewed by the manual review process, and transmitting, by the one or more processors, at least one of the number of content items, wherein the content category of each of the number of content items indicates whether the specific content item violates any content policies.

In some implementations, transmitting the at least one of the number of content items includes transmitting the at least one of the number of content items to an external content system. In some implementations, transmitting the at least one of the number of content items includes determining whether to serve to users each of the at least one of the number of content items based on the content category of each of the at least one of the number of content items. In some implementations, the threshold depends on the specific content category. In some implementations, the measurement includes a number of the first set of content items having the specific content category, and wherein the first result indicates that the number is less than or equal to the threshold. In some implementations, the measurement includes a rate of the first set of content items having the specific content category, and wherein the first result indicates that the rate is less than or equal to the threshold. In some implementations, the measurement includes a number of the first set of content items having the specific content category, and wherein the second result indicates that the number greater than the threshold. In some implementations, the measurement includes a rate of the first set of content items having the specific content category, and wherein the second result indicates that the rate is greater than the threshold. In some implementations, the content policy is associated with one or more users and wherein content items including a content category that violates the content policy are not served to the one or more users.

Another implementation of the disclosure relates to one or more computer-readable storage media having instructions stored thereon that, when executed by one or more processors, cause the one or more processors to receive a number of content items including a first set of content items associated with a content group, wherein at least some of the number of content items include a content category determined by a machine learning algorithm based on the content policy, determine a measurement associated with an amount of the first set of content items belonging to a specific content category, responsive to determining a first result from performing an operation using the measurement and a threshold, assign one or more of the number of content items to be categorized by at least one of the machine learning algorithm or a manual review process, responsive to determining a second result from performing the operation using the measurement and the threshold, automatically apply the specific content category to one or more other content items of the content group such that the one or more other content items are not reviewed by the manual review process, and transmit at least one of the number of content items, wherein the content category of each of the number of content items indicates whether the specific content item violates any content policies.

In some implementations, transmitting the at least one of the number of content items includes transmitting the at least one of the number of content items to an external content system. In some implementations, transmitting the at least one of the number of content items includes determining whether to serve to users each of the at least one of the number of content items based on the content category of each of the at least one of the number of content items. In some implementations, the threshold depends on the specific content category. In some implementations, the measurement includes a number of the first set of content items having the specific content category, and wherein the first result indicates that the number is less than or equal to the threshold. In some implementations, the measurement includes a rate of the first set of content items having the specific content category, and wherein the first result indicates that the rate is less than or equal to the threshold. In some implementations, the measurement includes a number of the first set of content items having the specific content category, and wherein the second result indicates that the number greater than the threshold. In some implementations, the measurement includes a rate of the first set of content items having the specific content category, and wherein the second result indicates that the rate is greater than the threshold. In some implementations, the content policy is associated with one or more users and wherein content items including a content category that violates the content policy are not served to the one or more users.

Another implementation of the disclosure relates to a system for protecting against exposure to content violating a content policy, the system including one or more processing circuits having one or more processors and one or more memories, each of the one or more memories storing instructions that, when executed by the one or more processors, cause the one or more processors to receive a number of content items including a first set of content items associated with a content group, wherein at least some of the number of content items include a content category determined by a machine learning algorithm based on the content policy, determine a measurement associated with an amount of the first set of content items belonging to a specific content category, responsive to determining the measurement is less than or equal to a threshold, assign one or more of the number of content items to be categorized by at least one of the machine learning algorithm or a manual review process, responsive to determining the measurement is greater than the threshold, automatically apply the specific content category to one or more other content items of the content group such that the one or more other content items are not reviewed by the manual review process, and serve at least one of the number of content items to users based on the content category of each of the at least one of the number of content items, wherein the content category of each of the number of content items indicates whether the specific content item violates any content policies.

In some implementations, the threshold depends on the specific content category.

The various aspects and implementations may be combined where appropriate.

DETAILED DESCRIPTION

Following below are more detailed descriptions of various concepts related to, and implementations of, methods, apparatuses, and systems for protecting against exposure to content violating a content policy. The various concepts introduced above and discussed in greater detail below may be implemented in any of numerous ways, as the described concepts are not limited to any particular manner of implementation.

It is often desirable for a content provider to control the content that is served to users. For example, a content provider may wish to ensure that inappropriate content is not served to impressionable audiences (e.g., young children, etc.).

Controlling the content that is served to users requires knowing what the content includes, depicts, and/or represents. For example, a content provider must determine what kinds of images and/or text are included in a piece of content before the content provider can determine whether the piece of content is appropriate for a particular audience. Determining the contents of a content item often includes classifying the content. For example, a machine learning algorithm may be used to classify content items into categories that indicate what the content items depicts, such as alcohol, firearms, violence, or beauty products, which may be used to determine to whom the content item is served and/or what types/categories of resources into which the content item is served. However, content items may not always be classified correctly. For example, a system may fail to classify a content item relating to firearms as depicting firearms, and, as a result, the content item may be served inappropriately to an unsuitable audience (e.g., young children, etc.). Correctly and reliably classifying content items is difficult. For example, a content provider may receive millions of content items every day and it may be impossible to provide human-review of every single content item.

In some implementations, machine learning algorithms may be used to classify content items. However, machine learning algorithms may have difficulty correctly classifying every content item. For example, in a given day, a machine learning algorithm may correctly classify 99.9% of incoming content items which, given the volume of content items, may still result in incorrectly classifying thousands of content items, thereby risking serving inappropriate content to users. Moreover, machine learning algorithms may have inherent limitations stemming from how they perform knowledge acquisition. For example, teaching a machine learning algorithm to detect edge-case classifications (e.g., such as a content item featuring a firearm only in the obscure background of an image) may require training the machine learning algorithm with data including all of the possible edge-case classifications. Content items may have a large if not infinite variability and therefore training a machine learning algorithm on all possible edge-case classifications is difficult. Therefore, to prevent inappropriate content items from being served to users, to minimize manual intervention, and to address inherent limitations in machine learning algorithms, an improved architecture for determining content item classifications and protecting against exposure to content violating a content policy is needed.

One solution utilizes a proportional response system configured to classify collections of content items based on one or more characteristics of each collection of content items. For example, the proportional response system may identify a number of content items within a content group as having a particular classification and may apply that classification to the entire content group based on a threshold number of the content items in the content group being determined to have the particular classification. In some implementations, if the number of content items within the content group having a particular classification is below the threshold, proportional response system may forward one or more of the content items to a review system (e.g., a manual review system, a machine learning review system, etc.). In various implementations, the proportional response system leverages low level classifications (e.g., classifications of individual content items) to classify high level groups (e.g., content groups having multiple content items, etc.). For example, the proportional response system may determine that a threshold number of content items in a content group are classified as depicting alcohol and based on the determination may classify every content item in the content group as depicting alcohol. Additionally or alternatively, in response to determining that the number of content items in a content group having a classification (e.g., labeled as depicting alcohol, etc.) is below a threshold, the proportional response system may provide at least some of the content items to a review system (e.g., a machine learning review system, a manual review system, etc.) for review. For example, the proportional response system may receive a number of content items some of which belong to a content group and may determine that the number of content items in the content group having a particular classification is below a threshold, and, in response, may send the content items belonging to the content group to a manual review system for review. In some implementations, the proportional response system facilitates analytical and/or inductive reasoning to determine patterns related to characteristics of content items in a content group and may implement additional safety measures to protect against improper content based on the analysis. In various implementations, classifications of the proportional response system may facilitate control of which content items are served. For example, the proportional response system may label a content item as depicting alcohol and may prevent the content item from being served to children's websites. In various implementations, the proportional response system reduces manual investigation and/or protects against inadvertent mislabeling of content items. For example, a content group may include three content items, two of which are labeled as depicting a particular content category. Based on the labeling of the two content items, the proportional response system may label the third content item as depicting the particular content category thereby eliminating a need for manual review of the third content item that may otherwise be necessary. In various implementations, the proportional response system facilitates enforcement of policies. For example, a content provider may have a policy against serving content items depicting firearms and the proportional response system may facilitate detecting content items that include firearms and preventing those content items from being served.

Figure 1:
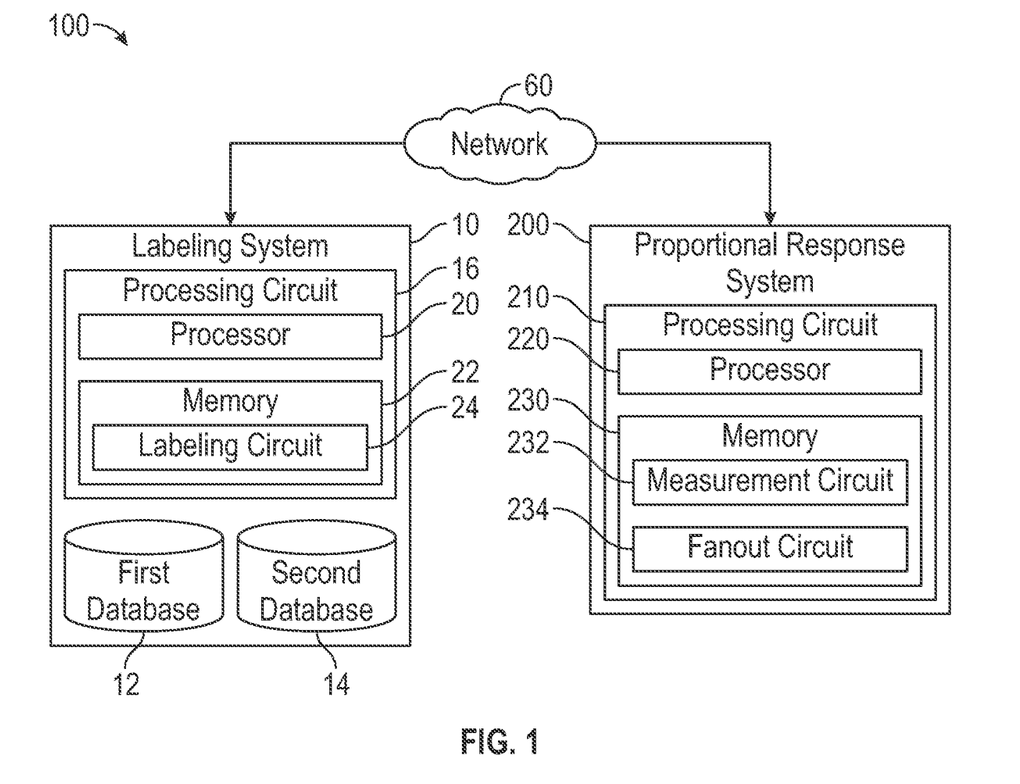
FIG. 1 is a block diagram illustrating a system for protecting against exposure to content violating a content policy, according to an illustrative implementation.

Referring now to FIG. 1, system 100 for protecting against exposure to content violating a content policy is shown, according to an illustrative implementation. System 100 may address inherent limitations in machine learning algorithms and/or may reduce the risk of serving inappropriate content to end users. System 100 includes labeling system 10 and proportional response system 200. In various implementations, components of system 100 communicate over network 60. Network 60 may include computer networks such as the Internet, local, wide, metro or other area networks, intranets, satellite networks, other computer networks such as voice or data mobile phone communication networks, combinations thereof, or any other type of electronic communications network. Network 60 may include or constitute a display network (e.g., a subset of information resources available on the Internet that are associated with a content placement or search engine results system, or that are eligible to include third party content items as part of a content item placement campaign). In various implementations, network 60 facilitates secure communication between components of system 100. As a non-limiting example, network 60 may implement transport layer security (TLS), secure sockets layer (SSL), hypertext transfer protocol secure (HTTPS), and/or any other secure communication protocol.

Labeling system 10 may determine what contents are included in or depicted/represented by content items. For example, labeling system 10 may determine that a content item depicts the use of alcohol. As an additional example, labeling system 10 may determine that a content item is related to the topic of hobbyist film photography. In various implementations, labeling system 10 classifies content items. For example, labeling system 10 may determine that a content item includes an image of a firearm and may label the content item with a label indicating that it depicts a firearm. As another example, labeling system 10 may determine that a content item includes the name of a political candidate and may label the content item as a political advertisement. In various implementations, labeling system 10 implements a machine learning algorithm to classify content items. Additionally or alternatively, labeling system 10 may implement a human review process to classify content items. For example, labeling system 10 may first review a content item using a machine learning algorithm and may then submit the content item for a second review by a human.

Labeling system 10 is shown to include first database 12, second database 14, and processing circuit 16. First database 12 may store unlabeled content items. For example, first database 12 may store content items such as website banners, popups, RSS feeds, audio, text articles, videos, images, and/or the like that are received from an external party (e.g., a merchant, etc.). In various implementations, the content items in first database 12 have yet to be analyzed by labeling system 10. For example, the content items in first database 12 may not include an indication of what content the content item includes/depicts. In some implementations, first database 12 is separate of labeling system 10. For example, first database 12 may be a standalone database and labeling system 10 may query first database 12 to retrieve content items. First database 12 may include one or more storage mediums. The storage mediums may include but are not limited to magnetic storage, optical storage, flash storage, and/or RAM. Labeling system 10 may implement or facilitate various APIs to perform database functions (i.e., managing data stored in first database 12). The APIs can be but are not limited to SQL, ODBC, JDBC, and/or any other data storage and manipulation API.

Second database 14 may store labeled content items. For example, second database 14 may store content items that have been classified (e.g., labeled) via a machine learning or manual review process. In various implementations, labeling system 10 retrieves unlabeled content items from first database 12, labels the content items, and stores the labeled content items in second database 14. In some implementations, second database 14 is separate of labeling system 10. For example, second database 14 may be a standalone database and labeling system 10 may interact with second database 14 to modify stored data. Second database 14 may include one or more storage mediums. The storage mediums may include but are not limited to magnetic storage, optical storage, flash storage, and/or RAM. Labeling system 10 may implement or facilitate various APIs to perform database functions (i.e., managing data stored in second database 14). The APIs can be but are not limited to SQL, ODBC, JDBC, and/or any other data storage and manipulation API.

Processing circuit 16 may include processor 20 and memory 22. Memory 22 may have instructions stored thereon that, when executed by processor 20, cause processing circuit 16 to perform the various operations described herein. The operations described herein may be implemented using software, hardware, or a combination thereof. Processor 20 may include a microprocessor, ASIC, FPGA, etc., or combinations thereof. In many implementations, processor 20 may be a multi-core processor or an array of processors. Memory 22 may include, but is not limited to, electronic, optical, magnetic, or any other storage devices capable of providing processor 20 with program instructions. Memory 22 may include a floppy disk, CD-ROM, DVD, magnetic disk, memory chip, ROM, RAM, EEPROM, EPROM, flash memory, optical media, or any other suitable memory from which processor 20 can read instructions. The instructions may include code from any suitable computer programming language such as, but not limited to, C, C++, C#, Java, JavaScript, Perl, HTML, XML, Python and Visual Basic.

Memory 22 may include labeling circuit 24. Labeling circuit 24 may receive content items and label the content items according to their contents. For example, labeling circuit 24 may determine that a content item includes a depiction of a maternity product and may label the content item as depicting a maternity product. In some implementations, labeling circuit 24 implements a machine learning algorithm to label content items. Additionally or alternatively, labeling circuit 24 may implement a manual review process (e.g., human review, etc.) to label content items. However, it should be understood that labeling circuit 24 may classify content items using any method known in the art. As a non-limiting example labeling circuit 24 may implement a keyword extraction algorithm, an ontological learning system, an automatic taxonomy learning system, a Bayesian network, regression analysis, genetic algorithms, support vector machines, artificial neural networks, and/or federated learning models. In some implementations, labeling circuit 24 automatically classifies text and/or images. Additionally or alternatively, labeling circuit 24 may process content items using models trained on training sets that include predetermined classifications associated with reference text and/or images. For example, labeling circuit 24 may analyze a content item by identifying text and/or images and comparing the identified text and/or images with a lookup table to determine classifications. Labeling system 10 may include limitations inherent to classifying content items.

Proportional response system 200 may address limitations inherent to labeling system 10. In various implementations, proportional response system 200 limits a risk associated with serving content that violates a policy and/or protects end users from inappropriate content. In various implementations, proportional response system 200 monitors a collection of content items and facilitates labeling of content items. For example, proportional response system 200 may monitor content items belonging to a content group and may assign a label to one or more of the content items in the content group based on detecting that a threshold number of the content items in the content group have a characteristic. As a non-limiting example, proportional response system 200 may identify that ten of eleven content items in a content group include the label "contains firearm" and may therefore label the eleventh content item with the label "contains firearm." In some implementations, proportional response system 200 may forward one or more content items for manual review in response to determining that the number of content items in a content group having a label is below a threshold. For example, proportional response system 200 may identify that one of eleven content items in a content group includes the label "contains firearm" and may forward the one content item to a manual review process for review of the label. In various implementations, disparate content items in a content group share one or more attributes. For example, all of the content items in a content group may relate to a specific topic such as outdoor goods. In some implementations, content groups are made up of items from a particular source and/or associated with a particular category of content. In various implementations, content groups are formed based on various criteria. For example, a content group may be formed from items sharing a characteristic (e.g., a source, a category, a purpose, a medium of presentation, an intended presentation period, a geographic association, etc.). Therefore, proportional response system 200 may leverage inductive and/or analytical reasoning to efficiently and accurately label content items in a content group (e.g., based on the knowledge that the majority of content items in the content group relate to outdoor goods, etc.). Additionally or alternatively, proportional response system 200 may identify patterns in low level data (e.g., specific content items, etc.) and use the patterns to classify collections of content items. In various implementations, proportional response system 200 facilitates efficiently labeling content items. For example, proportional response system 200 may identify a trend associated with a subset of labeled content items and may use the trend to label a number of unlabeled content items thereby eliminating the need to specifically analyze and label each individual content item (e.g., via a machine learning algorithm and/or a manual review process, etc.).

In some implementations, proportional response system 200 is a distributed system (e.g., cloud processing system, etc.). For example, proportional response system 200 may be a server, distributed processing cluster, cloud processing system, or any other computing device. Proportional response system 200 may include or execute at least one computer program or at least one script. In some implementations, proportional response system 200 includes combinations of software and hardware, such as one or more processors configured to execute one or more scripts. Proportional response system 200 is shown to include processing circuit 210.

Processing circuit 210 may include processor 220 and memory 230. Memory 230 may have instructions stored thereon that, when executed by processor 220, cause processing circuit 210 to perform the various operations described herein. The operations described herein may be implemented using software, hardware, or a combination thereof. Processor 220 may include a microprocessor, ASIC, FPGA, etc., or combinations thereof. In many implementations, processor 220 may be a multi-core processor or an array of processors.

Memory 230 may include, but is not limited to, electronic, optical, magnetic, or any other storage devices capable of providing processor 220 with program instructions. Memory 230 may include a floppy disk, CD-ROM, DVD, magnetic disk, memory chip, ROM, RAM, EEPROM, EPROM, flash memory, optical media, or any other suitable memory from which processor 220 can read instructions. The instructions may include code from any suitable computer programming language such as, but not limited to, C, C++, C#, Java, JavaScript, Perl, HTML, XML, Python and Visual Basic.

Memory 340 may include measurement circuit 232 and fanout circuit 234. Measurement circuit 232 may measure one or more characteristics associated with a collection of content items. For example, measurement circuit 232 may measure the number of content items in a content group having a first label. Additionally or alternatively, measurement circuit 232 may determine a frequency of an attribute among content items in a collection of content items, a likelihood that a content items belongs to a classification, and/or any other measure associated with one or more content items. In various implementations, measurement circuit 232 generates one or more statistical measures associated with a collection of content items. In some implementations, measurement circuit 232 continuously monitors a stream of content items. For example, measurement circuit 232 may receive labeled content items from labeling system 10 and update a count of content items in a content group having a characteristic in real time or near real time. As an additional example, measurement circuit 232 may update a count of content items in a content group having a characteristic in response to labeling circuit 10 labeling a content item (e.g., a content item in the content group, etc.). In some implementations, measurement circuit 232 retrieves content items from first database 12. In various implementations, measurement circuit 232 facilitates expanding content labels from specific content items to larger collections of content items. For example, measurement circuit 232 may determine a percentage of content items having a specific label and proportional response system 200 may use the percentage to determine whether to expand the label by labeling other content items in the content group with the label (e.g., content category, etc.). In various implementations, measurement circuit 232 sends measurements to fanout circuit 234. For example, measurement circuit 232 may retrieve one or more content items from first database 12, determine one or more measurements associated with the one or more content items, and send the one or more measurements to fanout circuit 234.

Fanout circuit 234 may expand one or more classifications to a collection of content items. For example, fanout circuit 234 may receive a measurement from measurement circuit 232 indicating that 60% of content items in a content group include the label (e.g., content category, etc.) "contains firearm," may determine that the label should be applied to all content items in the content group, and may apply the label to the content items in the content group not already having the label. In some implementations, fanout circuit 234 compares a measurement received from measurement circuit 232 to a threshold to determine whether to expand a classification to a collection of content items. In various implementations, fanout circuit 234 determines whether to expand a classification based on the type of classification. For example, fanout circuit 234 may expand a first label associated with firearms if 50% of content items in a content group include the first label and may expand a second label associated with alcohol if 30% of content items in a content group include the second label. In various implementations, fanout circuit 234 dynamically identifies content items to label. For example, fanout circuit 234 may expand a first type of label to a first collection of content items (e.g., a first content group) based on the first type of label and may expand a second type of label to a second collection of content items (e.g., a second content group) based on the second type of label. In some implementations, fanout circuit 234 may dynamically determine a threshold for fanout. For example, fanout circuit 234 may model the labeling outcomes of a number of potential threshold values associated with each label to identify a threshold.

Figure 2:
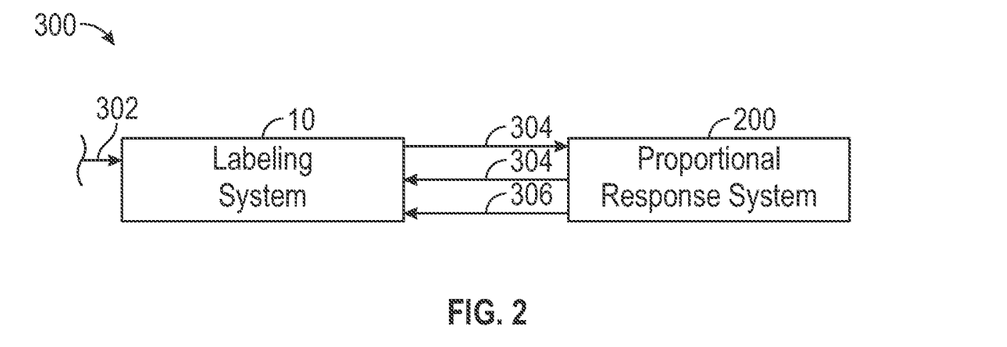
FIG. 2 is a diagram illustrating various entities interacting over a network, according to an illustrative implementation.

Referring now to FIG. 2, computer architecture 300 for limiting a risk associated with serving content that violates a policy and/or protecting end users from improper content is shown, according to an illustrative implementation. Computer architecture 300 is shown to include labeling system 10 and proportional response system 200. In some implementations, labeling system 10 and proportional response system 200 are co-located. For example, labeling system 10 and proportional response system 200 may be part of a content serving system housed on a server. Additionally or alternatively, labeling system 10 and proportional response system 200 may be separate. For example, a first party may operate labeling system 10 and pass the results to a second party that operates proportional response system 200.

At step 302, labeling system 10 receives one or more content items. For example, labeling system 10 may receive content items from a content producer. Content items may include text, images, video, sound, and/or the like. In some implementations, content items include advertisements. In various implementations, one or more content items may form a collection of content items. For example, a collection of content items relating to a specific topic (e.g., bicycles, etc.) may form a content group. In some implementations, a content group may be associated with a specific audience. For example, a collection of content items intended for serving to a specific audience (e.g., men, women, etc.) may form a content group. Additionally or alternatively, one or more rules are used to form content groups. In various implementations, labeling system 10 labels the one or more content items received in step 302. For example, labeling system 10 may label the one or more content items using a machine learning and/or artificial intelligence algorithm. Additionally or alternatively, labeling system 10 may label the one or more content items using a manual review process. For example, labeling system 10 may label a content item using a machine learning algorithm and then pass the labeled content item to a human to confirm the labeling is correct.

At step 304, proportional response system 200 may interact with labeling system 10 to measure one or more characteristics of the one or more content items. In various implementations, proportional response system 200 continuously monitors characteristics associated with the one or more content items received in step 302. For example, proportional response system 200 may monitor what proportion of received content items have been labeled by labeling system 10. In various implementations, proportional response system 200 measures the number of content items in a content group having a label. For example, proportional response system 200 may determine that 19 out of 33 content items in a content group have a specific label. In some implementations, step 304 includes measurement circuit 232 querying second database 14 and/or first database 12.

At step 306, proportional response system 200 may expand one or more labels. For example, proportional response system 200 may expand a label associated with a number of content items to a content group associated with the number of content items. In various implementations, proportional response system 200 determines which labels to expand based on the measurements in step 304. For example, proportional response system 200 may determine that 60% of content items in a content group have a label of "contains violence" and in response may expand the label "contains violence" to at least some of the other content items in the content group. In various implementations, step 306 includes comparing one or more measurements from step 304 to a threshold. For example, proportional response system 200 may compare a measurement of the number of content items in a content group having a label to a threshold associated with the specific label to determine whether to expand the label to the content group. In some implementations, step 306 includes labeling content items that have not yet been labeled. Additionally or alternatively, step 306 may include overwriting previous labels associated with a content item. For example, a content item may include the label "nonviolent" and step 306 may include proportional response system 200 overwriting the label with "contains violence." In various implementations, computer architecture 300 facilitates reducing a computational overhead of labeling system 10. For example, proportional response system 200 may leverage inductive reasoning techniques to identify labels for content items without having to execute a computationally expensive machine learning algorithm on each content item. In some implementations, proportional response system 200 obfuscates the need for manual review of labels. For example, proportional response system 200 may determine with high likelihood that all content items in a content group include the label "contains violence" and may prevent the need for a manual review process to confirm the label "contains violence" for every content item. In some implementations, proportional response system 200 protects against incorrectly labeled content. For example, proportional response system 200 may receive five content items, one of which is labeled "contains firearms" and may send the one content item to a manual review process for review of the label "contains firearms" in response to determining that the proportion of content items in the content group having the label (e.g., one of five) is below a threshold. In various implementations, proportional response system 200 prevents inappropriate content from being served to end users. For example, proportional response system 200 may facilitate identifying content items that a typical labeling process may miss and prevent those content items from being served to inappropriate audiences (e.g., children, etc.).

Figure 3:
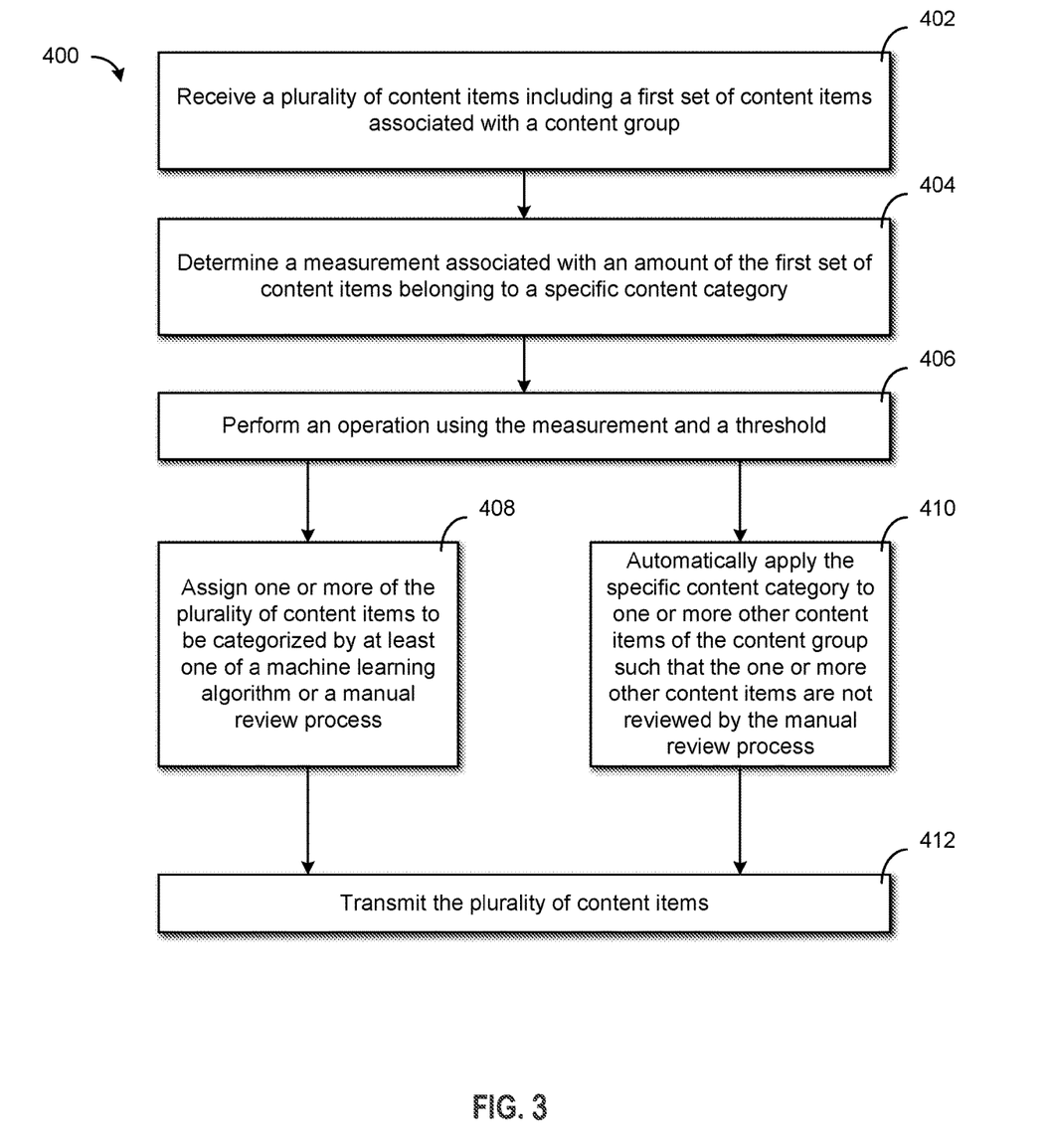
FIG. 3 is a flow diagram illustrating a method of protecting against exposure to content violating a content policy, according to an implementation.

Referring now to FIG. 3, method 400 for preventing inappropriate content from being served to end users is shown, according to an illustrative implementation. In various implementations, method 400 is performed by proportional response system 200. At step 402, proportional response system 200 may receive a plurality of content items including a first set of content items associated with a content group. In some implementations, step 402 includes retrieving content items from a database. For example, proportional response system 200 may query a database to retrieve content items. Additionally or alternatively, proportional response system 200 may query a database for characteristics associated with content items.

At step 404, proportional response system 200 may determine a measurement associated with an amount of the first set of content items belonging to a specific category. For example, proportional response system 200 may analyze the received plurality of content items to identify a proportion of the first set of content items having a label. Additionally or alternatively, proportional response system 200 may query an external system (e.g., a database, etc.) to determine the measurement. In some implementations, proportional response system 200 determines a number of measurements. For example, proportional response system 200 may determine a percentage of content items in a content group having a first label and may also determine a confidence score associated with the likelihood that the first label applies to the other content items in the content group.

At step 406, proportional response system 200 may perform an operation using the measurement and a threshold. In various implementations, the threshold is dependent on the specific content category. For example, a first label associated with a first content category may have a first threshold and a second label associated with a second content category may have a second threshold. In various implementations, the operation includes a comparison. For example, proportional response system 200 may compare percentage of content items in a content group having a label to a threshold. As an additional example, proportional response system 200 may compare a raw number of content items having a label to a threshold.

At step 408, proportional response system 200 may assign one or more of the plurality of content items to be categorized by at least one of a machine learning algorithm or a manual review process. In various implementations, step 408 is performed in response to determining that the measurement is less than the threshold. For example, proportional response system 200 may compare a percentage of content items in a content group having a first label to a threshold, determine that the percentage is less than the threshold, and assign one or more of the plurality of content items to be categorized by an artificial intelligence algorithm. In some implementations, step 408 includes flagging the one or more of the plurality of content items for categorization (e.g., setting a flag in a data structure, etc.). Additionally or alternatively, step 408 may include sending the one or more of the plurality of content items to an analysis system (e.g., labeling system 10, etc.). In various implementations, proportional response system 200 may dynamically select between step 408 and step 410. For example, proportional response system 200 may monitor characteristics of a content group in real time (e.g., as a labeling system labels the content items in the content group, etc.) and may perform actions on content items in the content group based on results of the monitoring. As a non-limiting example, at a first point in time, proportional response system 200 may determine that a threshold number of content items in a content group have a particular classification and may apply the particular classification to at least some of the content items in the content group and at a second point in time proportional response system 200 may determine that the number of content items in the content group is below the threshold and may assign at least one of the content items in the content group to be analyzed by a machine learning algorithm and/or a manual review process.

At step 410, proportional response system 200 may automatically apply the specific content category to one or more other content items of the content group such that the one or more other content items are not reviewed by the manual review process. In various implementations, step 410 includes expanding a label to a content group. For example, proportional response system 200 may expand the label "contains violence" from a first content item to a number of other content items in a content group that the first content item belongs to such that the number of other content items also include the label "contains violence." In some implementations, step 410 includes expanding a number of labels. Additionally or alternatively, step 410 may include expanding other characteristics. In various implementations, applying the specific content category to the one or more other content items obfuscates the need to analyze the one or more other content items using an analysis system to determine a label. For example, a content item labeled by proportional response system 200 may not need to be labeled by an analysis system such as labeling system 10. In various implementations, step 410 may reduce a risk associated with serving inappropriate content to end users. For example, proportional response system 200 may determine that based on labels associated with labeled content items in a content group it is likely that every content item in the content group, including unlabeled content items, are associated with the content category indicated by the label and may therefore apply the label to every content item in the content group. At step 412, proportional response system 200 may transmit the plurality of content items. In some implementations, step 412 includes serving one or more of the content items to end users. Additionally or alternatively, step 412 may include transmitting one or more of the content items to an external system (e.g., a content serving system, etc.).

Figure 4A:
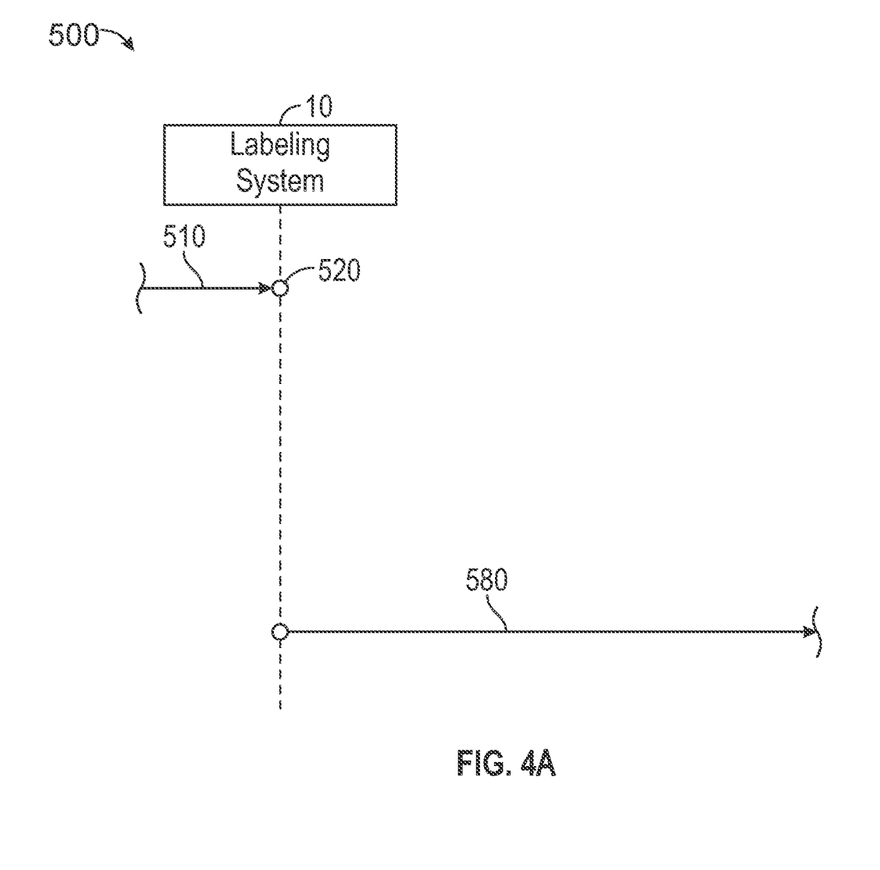
FIG. 4A is a diagram illustrating inherent limitations of a machine learning system, according to an illustrative implementation.
Figure 4B:
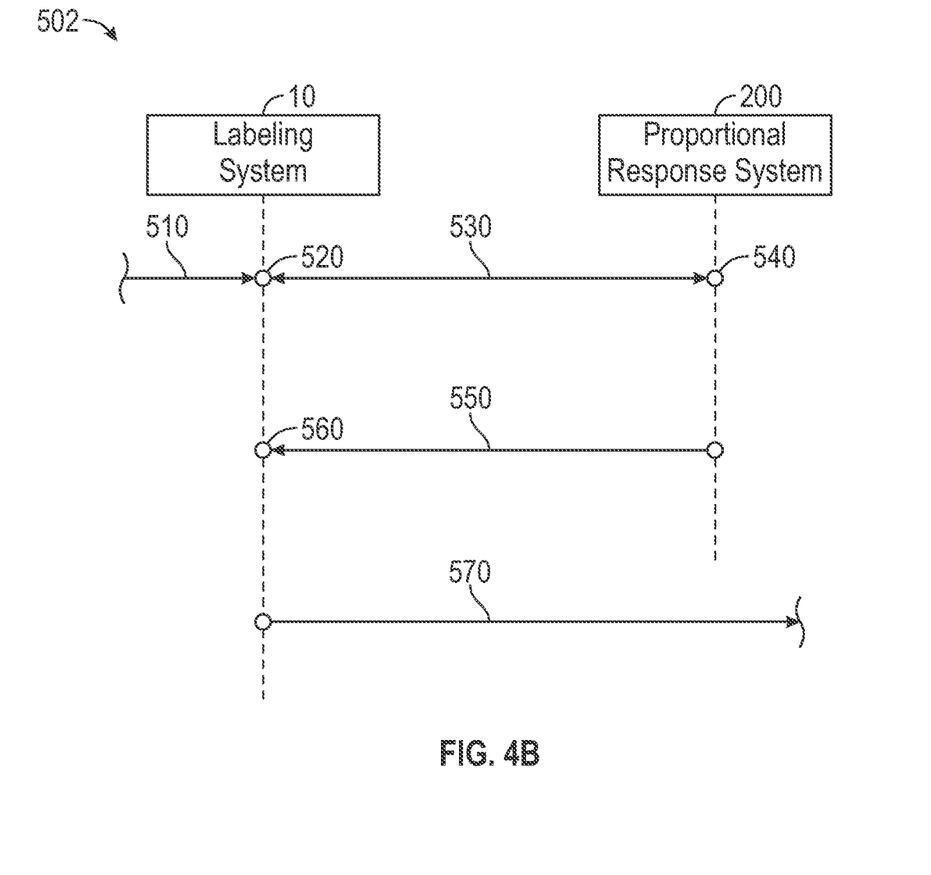
FIG. 4B is a diagram illustrating the system of FIG. 1 addressing inherent limitations of a machine learning system to prevent exposure to content violating a content policy, according to an illustrative implementation.

Proportional response system 200 may offer many benefits over existing systems. In various implementations, proportional response system 200 facilitates controlling the content that is served to users. For example, proportional response system 200 may facilitate determining content categories associated with content items that may be used to determine whether to serve the content items to specific end users. Additionally or alternatively, proportional response system 200 may facilitate reducing a computational overhead associated with labeling content items. For example, proportional response system 200 may leverage content items that have already been labeled to determine labels associated with unlabeled content items. In various implementations, proportional response system 200 reduces manual review overhead. For example, proportional response system 200 may label content items that would otherwise require manual review. FIGS. 4A-4B, illustrate advantages of proportional response system 200.

Referring now specifically to FIG. 4A, system 500 is shown, according to an illustrative implementation. System 500 may not include proportional response system 200. In various implementations, system 500 has many disadvantages as compared with the systems and methods described herein. At step 510, labeling system 10 may receive a plurality of content items. At step 520, labeling system 10 may label the plurality of content items. In various implementations, step 520 includes labeling the plurality of content items with a machine learning algorithm. Additionally or alternatively, labeling system 10 may label the plurality of content items using a manual review process. In various implementations, step 520 may include mislabeling one or more of the plurality of content items. For example, step 520 may include labeling a content item that depicts alcohol usage as "does not contain alcohol." As another example, step 520 may include not assigning any label to a content item even though the content item should be included in a specific content category (e.g., the content item depicts a firearm, etc.). In some implementations, step 520 is computationally expensive and/or takes a significant amount of time to complete. At step 580, labeling system 10 may transmit one or more of the plurality of content items. In various implementations, step 580 includes serving one or more of the plurality of content items to end users. Additionally or alternatively, step 580 may include transmitting one or more of the plurality of content items to an external system. In various implementations, step 580 includes serving one or more of the plurality of content items to end users based on the labels determined during step 520. In various implementations, step 580 includes serving content items to end users that violates a policy. For example, a policy may mandate that content depicting firearms is not served to users under the age of 18 and labeling system 10 may accidentally serve a content item depicting firearms to someone under the age of 18 because the content item was incorrectly labeled as not depicting firearms.

Referring now to FIG. 4B, system 502 that addresses the inherent limitations of machine learning algorithms and protects against exposure to content violating a content policy is shown, according to an illustrative implementation. In various implementations, system 502 includes proportional response system 200. Proportional response system 200 may improve a computational efficiency of labeling content items, reduce manual review overhead, and protect against serving content that violates a content policy to users. In various implementations, proportional response system 200 protects against improperly labeled content items. At step 510, labeling system 10 may receive a plurality of content items. At step 520, labeling system 10 may label the plurality of content items (e.g., as described above with reference to FIG. 4A, etc.). At step 530, proportional response system 200 may measure one or more characteristics of the plurality of content items. In some implementations, step 530 is performed when a portion of the plurality of content items are labeled. Additionally or alternatively, step 530 may be performed when all of the plurality of content items are labeled.

At step 540, proportional response system 200 may compare the one or more measurements to a threshold. For example, proportional response system 200 may compare a percentage of content items in a content group having a label to threshold. At step 550, proportional response system 200 may label one or more of the plurality of content items. For example, in response to determining that the a number of content items in a content group having a label exceeds a threshold, proportional response system 200 may expand the label to one or more of the plurality of content items. In some implementations, proportional response system 200 expands the label based on a different determination. For example, proportional response system 200 may expand the label based on determining that a percentage of content items in a content group having a label is less than a threshold. In various implementations, step 550 reduces a computational overhead of labeling the plurality of content items. For example, labeling system 10 may label half of the plurality of content items in a content group, proportional response system 200 may determine that the label should be expanded to the entire content group, and proportional response system 200 may label all the content items in the content group with the label. In various implementations, proportional response system 200 protects against improperly labeled content items. For example, proportional response system 200 may receive a number of content items belonging to a content group, may determine that the number of content items in the content group having a particular classification is below a threshold, and may transmit the number of content items having the particular classification to a manual review process for review (e.g., to verify that the particular classification is valid, etc.). In some implementations, proportional response system 200 protects against exposure to content violating a content policy. For example, at step 570, labeling system 10 may serve one or more of the plurality of content items to end users based on the expanded labels from proportional response system 200.

Figure 5:
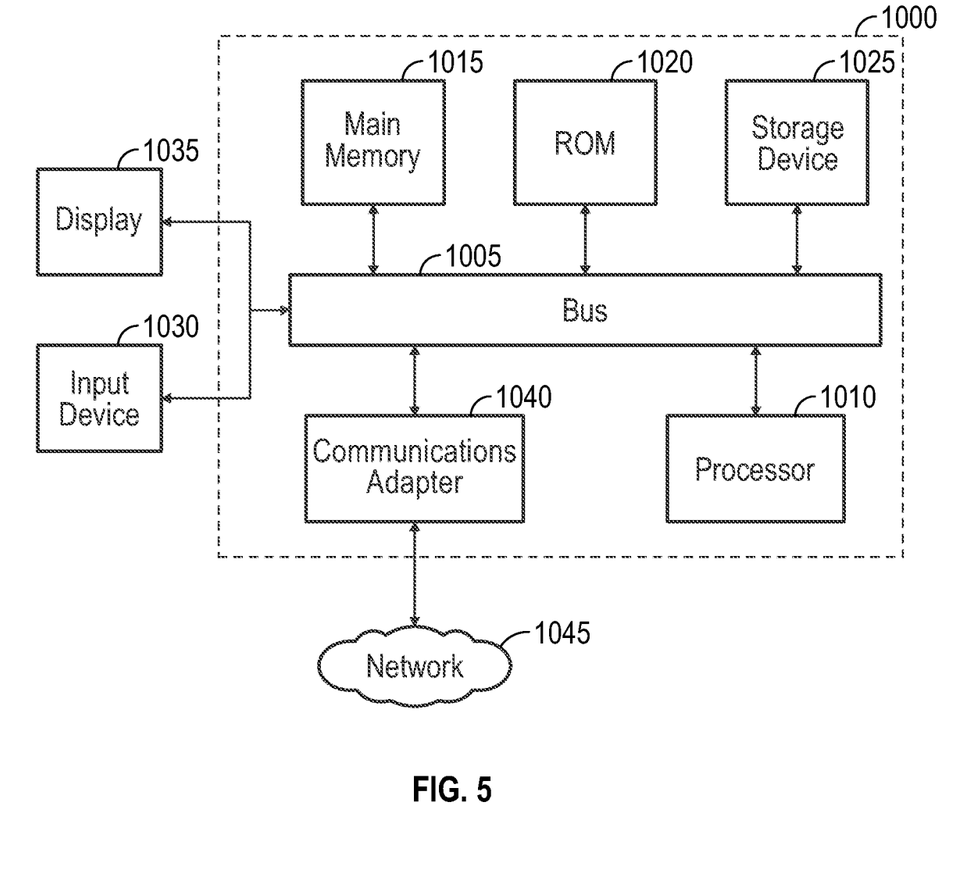
FIG. 5 is a block diagram of a computing system, according to an illustrative implementation.

FIG. 5 illustrates a depiction of a computing system 1000 that can be used, for example, to implement any of the illustrative systems (e.g., proportional response system 200, etc.) described in the present disclosure. The computing system 1000 includes a bus 1005 or other communication component for communicating information and a processor 1010 coupled to the bus 1005 for processing information. The computing system 1000 also includes main memory 1015, such as a random access memory ("RAM") or other dynamic storage device, coupled to the bus 1005 for storing information, and instructions to be executed by the processor 1010. Main memory 1015 can also be used for storing position information, temporary variables, or other intermediate information during execution of instructions by the processor 1010. The computing system 1000 may further include a read only memory ("ROM") 1020 or other static storage device coupled to the bus 1005 for storing static information and instructions for the processor 1010. A storage device 1025, such as a solid state device, magnetic disk or optical disk, is coupled to the bus 1005 for persistently storing information and instructions.

The computing system 1000 may be coupled via the bus 1005 to a display 1035, such as a liquid crystal display, or active matrix display, for displaying information to a user. An input device 1030, such as a keyboard including alphanumeric and other keys, may be coupled to the bus 1005 for communicating information, and command selections to the processor 1010. In another implementation, the input device 1030 has a touch screen display 1035. The input device 1030 can include a cursor control, such as a mouse, a trackball, or cursor direction keys, for communicating direction information and command selections to the processor 1010 and for controlling cursor movement on the display 1035.

In some implementations, the computing system 1000 may include a communications adapter 1040, such as a networking adapter. Communications adapter 1040 may be coupled to bus 1005 and may be configured to enable communications with a computing or communications network 1045 and/or other computing systems. In various illustrative implementations, any type of networking configuration may be achieved using communications adapter 1040, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. In alternative implementations, hardwired circuitry may be used in place of or in combination with software instructions to implement illustrative implementations. Thus, implementations are not limited to any specific combination of hardware circuitry and software.

Although an example processing system has been described in FIG. 5, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user. In situations in which the systems described herein collect personal information about users or applications installed on a user device, or make use of personal information, the users are provided with an opportunity to control whether programs or features collect user information (e.g., information about a user's social network, social actions, or activities, profession, a user's preferences, or a user's current location). In addition or in the alternative, certain data may be treated in one or more ways before it is stored or used, so that personal information is removed.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). The computer storage medium may be tangible and/or may be non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Circuit as utilized herein, may be implemented using hardware circuitry (e.g., FPGAs, ASICs, etc.), software (instructions stored on one or more computer readable storage media and executable by one or more processors), or any combination thereof.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant ("PDA"), a mobile audio or video player, a game console, a Global Positioning System ("GPS") receiver, or a portable storage device (e.g., a universal serial bus ("USB") flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for protecting against exposure to content violating a content policy, the method comprising:
receiving, by one or more processors, a plurality of content items including a first set of content items associated with a content group, wherein at least some of the plurality of content items include a content category determined by a machine learning algorithm based on the content policy;
determining, by the one or more processors, a measurement associated with a subset of the content group belonging to a specific content category;
responsive to determining a first result from performing an operation using the measurement and a threshold:
automatically applying, by the one or more processors, the specific content category to one or more other content items of the content group such that the one or more other content items are not reviewed by a manual review process; and
transmitting, by the one or more processors, at least one of the plurality of content items, wherein the content category of each of the plurality of content items indicates whether the each content item violates any content policies.

2. The method of claim 1, comprising:
responsive to determining the first result from performing the operation using the measurement and the threshold:
flagging, by the one or more processors, the one or more other content items as associated with a violation of the content policy.

3. The method of claim 1, wherein transmitting the at least one of the plurality of content items includes determining whether to serve to users each of the at least one of the plurality of content items based on the content category of each of the at least one of the plurality of content items.

4. The method of claim 1, comprising:
responsive to determining a second result from performing the operation using the measurement and the threshold:
assigning, by the one or more processors, one or more of the plurality of content items to be categorized by at least one of the machine learning algorithm or the manual review process.

5. The method of claim 4, wherein the measurement includes a number of the content group having the specific content category, and wherein the second result indicates that the number is less than or equal to the threshold.

6. The method of claim 4, wherein the measurement includes a rate of the content group having the specific content category, and wherein the second result indicates that the rate is less than or equal to the threshold.

7. The method of claim 1, wherein the measurement includes a number of the content group having the specific content category, and wherein the first result indicates that the number greater than the threshold.

8. The method of claim 1, wherein the measurement includes a rate of the content group having the specific content category, and wherein the first result indicates that the rate is greater than the threshold.

9. The method of claim 1, wherein the content policy is associated with one or more users, wherein the specific content category violates the content policy, and wherein the one or more other content items are not served to the one or more users.

10. One or more non-transitory computer-readable storage media having instructions stored thereon that, when executed by one or more processors, cause the one or more processors to:
receive a plurality of content items including a set of content items associated with a content group, wherein at least some of the plurality of content items include a content category determined by a machine learning algorithm based on a content policy;
determine a measurement associated with a subset of the content group belonging to a specific content category;
responsive to determining a first result from performing an operation using the measurement and a threshold:
automatically apply the specific content category to one or more other content items of the content group such that the one or more other content items are not reviewed by a manual review process; and
transmit at least one of the plurality of content items, wherein the content category of each of the plurality of content items indicates whether the each content item violates any content policies.

11. The one or more computer-readable storage media of claim 10, wherein the instructions, when executed by the one or more processors, cause the one or more processors to:
responsive to determining the first result from performing the operation using the measurement and the threshold:
flag the one or more other content items as associated with a violation of the content policy.

12. The one or more computer-readable storage media of claim 10, wherein transmitting the at least one of the plurality of content items includes determining whether to serve to users each of the at least one of the plurality of content items based on the content category of each of the at least one of the plurality of content items.

13. The one or more computer-readable storage media of claim 10, wherein the instructions, when executed by the one or more processors, cause the one or more processors to:
responsive to determining a second result from performing the operation using the measurement and the threshold:
assign one or more of the plurality of content items to be categorized by at least one of the machine learning algorithm or the manual review process.

14. The one or more computer-readable storage media of claim 13, wherein the measurement includes a number of the content group having the specific content category, and wherein the second result indicates that the number is less than or equal to the threshold.

15. The one or more computer-readable storage media of claim 13, wherein the measurement includes a rate of the content group having the specific content category, and wherein the second result indicates that the rate is less than or equal to the threshold.

16. The one or more computer-readable storage media of claim 10, wherein the measurement includes a number of the content group having the specific content category, and wherein the first result indicates that the number greater than the threshold.

17. The one or more computer-readable storage media of claim 10, wherein the measurement includes a rate of the content group having the specific content category, and wherein the first result indicates that the rate is greater than the threshold.

18. The one or more computer-readable storage media of claim 10, wherein the content policy is associated with one or more users, wherein the specific content category violates the content policy, and wherein the one or more other content items are not served to the one or more users.

19. A system for protecting against exposure to content violating a content policy, the system comprising one or more processing circuits having one or more processors and one or more memories, each of the one or more memories storing instructions that, when executed by the one or more processors, cause the one or more processors to:
   receive a plurality of content items including a set of content items associated with a content group, wherein at least some of the plurality of content items include a content category determined by a machine learning algorithm based on the content policy;
   determine a measurement associated with a subset of the content group belonging to a specific content category;
   responsive to determining the measurement is greater than a threshold:
      automatically apply the specific content category to one or more other content items of the content group such that the one or more other content items are not reviewed by a manual review process; and
   serve at least one of the plurality of content items to users based on the content category of each of the at least one of the plurality of content items, wherein the content category of each of the plurality of content items indicates whether the each content item violates any content policies.

20. The system of claim 19, wherein the instructions, when executed by the one or more processors, cause the one or more processors to:
   responsive to determining the measurement is less than or equal to the threshold:
      assign one or more of the plurality of content items to be categorized by at least one of the machine learning algorithm or the manual review process.

* * * * *